US012780209B2

(12) United States Patent
Zeiynali Farid et al.

(10) Patent No.: US 12,780,209 B2

(45) Date of Patent: Nov. 3, 2026

(54) LANE SELECTION USING CONNECTED VEHICLE DATA INCLUDING LANE CONNECTIVITY AND INPUT UNCERTAINTY INFORMATION

(71) Applicant: Toyota Motor Engineering & Manufacturing North America, Inc., Plano, TX (US)

(72) Inventors: Yashar Zeiynali Farid, Mountain View, CA (US); Sergei S. Avedisov, Mountain View, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

(*) Notice: Subject to any disclaimer, the term of this patent is extended or adjusted under 35 U.S.C. 154(b) by 99 days.

(21) Appl. No.: 18/627,807

(22) Filed: Apr. 5, 2024

(65) Prior Publication Data

US 2025/0313207 A1 Oct. 9, 2025

(51) Int. Cl.

| | |
|---|---|
| ***B60W 30/00*** | (2006.01) |
| ***B60W 30/18*** | (2012.01) |
| ***G08G 1/01*** | (2006.01) |

(52) U.S. Cl.

CPC ..... *B60W 30/18163* (2013.01); *G08G 1/0112* (2013.01); *G08G 1/0125* (2013.01); *B60W 2420/40* (2013.01); *B60W 2556/00* (2020.02); *B60W 2720/24* (2013.01)

(58) Field of Classification Search

CPC ....... B60W 30/18163; B60W 2420/40; B60W 2556/00; B60W 2720/24; G08G 1/0112; G08G 1/0125

See application file for complete search history.

(56) References Cited

U.S. PATENT DOCUMENTS

| | | | | |
|---|---|---|---|---|
| 9,672,734 | B1 * | 6/2017 | Ratnasingam | ... G08G 1/096741 |
| 10,137,896 | B2 | 11/2018 | Zhuang et al. | |
| 10,152,882 | B2 * | 12/2018 | Zhao | G08G 1/0145 |
| 10,916,125 | B2 * | 2/2021 | Rajab | B60W 30/12 |
| 11,708,092 | B2 * | 7/2023 | Isele | B60W 10/20 701/26 |
| 12,205,456 | B1 * | 1/2025 | White | G07C 5/008 |
| 12,385,752 | B2 * | 8/2025 | Kari | G01C 21/3446 |
| 2003/0074131 | A1 * | 4/2003 | Barkowski | G08G 1/096827 701/431 |
| 2014/0278052 | A1 | 9/2014 | Slavin et al. | |
| 2019/0310636 | A1 * | 10/2019 | Halder | B60W 50/00 |

(Continued)

*Primary Examiner* — Logan M Kraft

*Assistant Examiner* — Sherman D Manley

(74) *Attorney, Agent, or Firm* — Dinsmore & Shohl LLP

(57) ABSTRACT

A method may include generating a dynamic lane-level forward graph including a plurality of nodes for a road. The method may include computing weights for each action of a vehicle traveling from one node to a next node. The method may include determining values of different actions for the vehicle based on the dynamic lane-level forward graph starting from a node of the vehicle to a node of destination and the weights for each action of the vehicle. The method may include selecting an action among the different actions based on a comparison of the values of the different actions. The method may include instructing the vehicle to execute the selected action for the vehicle.

15 Claims, 11 Drawing Sheets

(56) References Cited

U.S. PATENT DOCUMENTS

| | | | | |
|---|---|---|---|---|
| 2019/0391580 | A1* | 12/2019 | Di Cairano | B60W 30/0956 |
| 2020/0017117 | A1* | 1/2020 | Milton | G06N 3/09 |
| 2020/0035092 | A1* | 1/2020 | Rajab | B60W 30/12 |
| 2021/0312725 | A1* | 10/2021 | Milton | G06N 3/098 |
| 2022/0065644 | A1* | 3/2022 | Kundu | G01C 21/3446 |
| 2022/0185326 | A1* | 6/2022 | Isele | B60W 60/0015 |
| 2022/0185334 | A1* | 6/2022 | Bae | G08G 1/0145 |
| 2022/0274624 | A1 | 9/2022 | Wray et al. | |
| 2022/0315047 | A1* | 10/2022 | Probst | B60W 30/16 |
| 2023/0051486 | A1* | 2/2023 | Huang | B60W 60/0015 |
| 2023/0060940 | A1* | 3/2023 | Avedisov | B60W 30/09 |
| 2023/0083645 | A1* | 3/2023 | Zeiynali Farid | B60W 30/18163 701/25 |
| 2023/0116442 | A1* | 4/2023 | Qi | G05D 1/2465 701/28 |
| 2023/0127576 | A1 | 4/2023 | Kreidieh et al. | |
| 2023/0131614 | A1 | 4/2023 | Kreidieh et al. | |
| 2023/0134612 | A1* | 5/2023 | Zeiynali Farid | G08G 1/0141 340/934 |
| 2023/0341234 | A1* | 10/2023 | Nister | B60W 60/001 |
| 2023/0360534 | A1* | 11/2023 | Avedisov | G08G 1/052 |
| 2024/0043040 | A1* | 2/2024 | Liu | B60W 30/0956 |
| 2025/0033640 | A1* | 1/2025 | Bai | B60W 30/18163 |
| 2025/0074467 | A1* | 3/2025 | Shin | B60W 60/0015 |

* cited by examiner

LANE SELECTION USING CONNECTED VEHICLE DATA INCLUDING LANE CONNECTIVITY AND INPUT UNCERTAINTY INFORMATION

TECHNICAL FIELD

The present specification relates to traffic monitoring, and more particularly, to lane selection using connected vehicle data including lane connectivity and input uncertainty information.

BACKGROUND

Lane selection for vehicles can be difficult to determine. For example, vehicles can have limited view when changing lanes, and individual vehicle sensors can have limited capabilities. Events that occur downstream can affect the performance and selection of lane changes. Selecting a lane without knowledge of downstream events can lead to sub-optimal performance in terms of efficiency and comfort. Even if vehicles receive downstream data, finding the best lane can be challenging. While vehicle systems may utilize a high-definition map and a high-precision GPS sensor to localize the vehicle and identify a lane, the high-definition map and high-precision GPS sensor are not available in most vehicles. Moreover, such requirements can be cost prohibitive, and the high-definition map may require frequent updates. As such, a need exists for methods of lane selection using connected vehicle data including lane connectivity and input uncertainty information.

SUMMARY

In an embodiment, a method may include generating a dynamic lane-level forward graph including a plurality of nodes for a road. The method may include computing weights for each action of a vehicle traveling from one node to a next node. The method may include determining values of different actions for the vehicle based on the dynamic lane-level forward graph starting from a node of the vehicle to a node of destination and the weights for each action of the vehicle. The method may include selecting an action among the different actions based on a comparison of the values of the different actions. The method may include instructing the vehicle to execute the selected action for the vehicle.

In another embodiment, a system may include one or more processors programmed to: generate a dynamic lane-level forward graph including a plurality of nodes for a road. The one or more processors may be programmed to compute weights for each action of a vehicle traveling from one node to a next node. The one or more processors may be programmed to determine values of different actions for the vehicle based on the dynamic lane-level forward graph starting from a node of the vehicle to a node of destination and the weights for each action of the vehicle. The one or more processors may be programmed to select an action among the different actions based on a comparison of the values of the different actions. The one or more processors may be programmed to instruct the vehicle to execute the selected action for the vehicle.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include a method and system for lane selection using connected vehicle data including lane connectivity and input uncertainty information. Selection of a best lane of a highway can be challenging. Drivers, or even the vehicle itself, may have limited view, and individual vehicle sensors may have limited capabilities. Events that occur downstream relative to lane selection identification can affect vehicle performance. Examples of downstream events can include a congested exit lane, a slow-moving truck, and a vehicle incident.

In particular, selecting the best lane to change for the vehicle may require input information which can be uncertain. For instance, a lane identifier of a vehicle may be an input. On a multi-lane highway, vehicle systems may utilize high-definition map and high-precision GPS to localize the vehicle and thereby determine the lane the vehicle is in. However, these capabilities are not available in most vehicles. Further, such requirements can be expensive, and the high-definition map can require frequent updates, adversely leading to unnecessary computational processing.

As further disclosed below, the systems and methods herein are configured to, via a server, provide a decentralized lane selection technique that utilizes uncertain input and plan vehicle actions based on uncertainty while considering lane connectivity information. By generating a dynamic graph, the server may be configured to select and instruct a vehicle to select a lane that considers uncertainty in an ego vehicle lane identifier; considers uncertainty in a transition from one lane to another lane; prunes a search graph to reduce computational complexity of the lane selection; and computes weights using metrics, such as marginal contribution to congestion.

Figure 1:
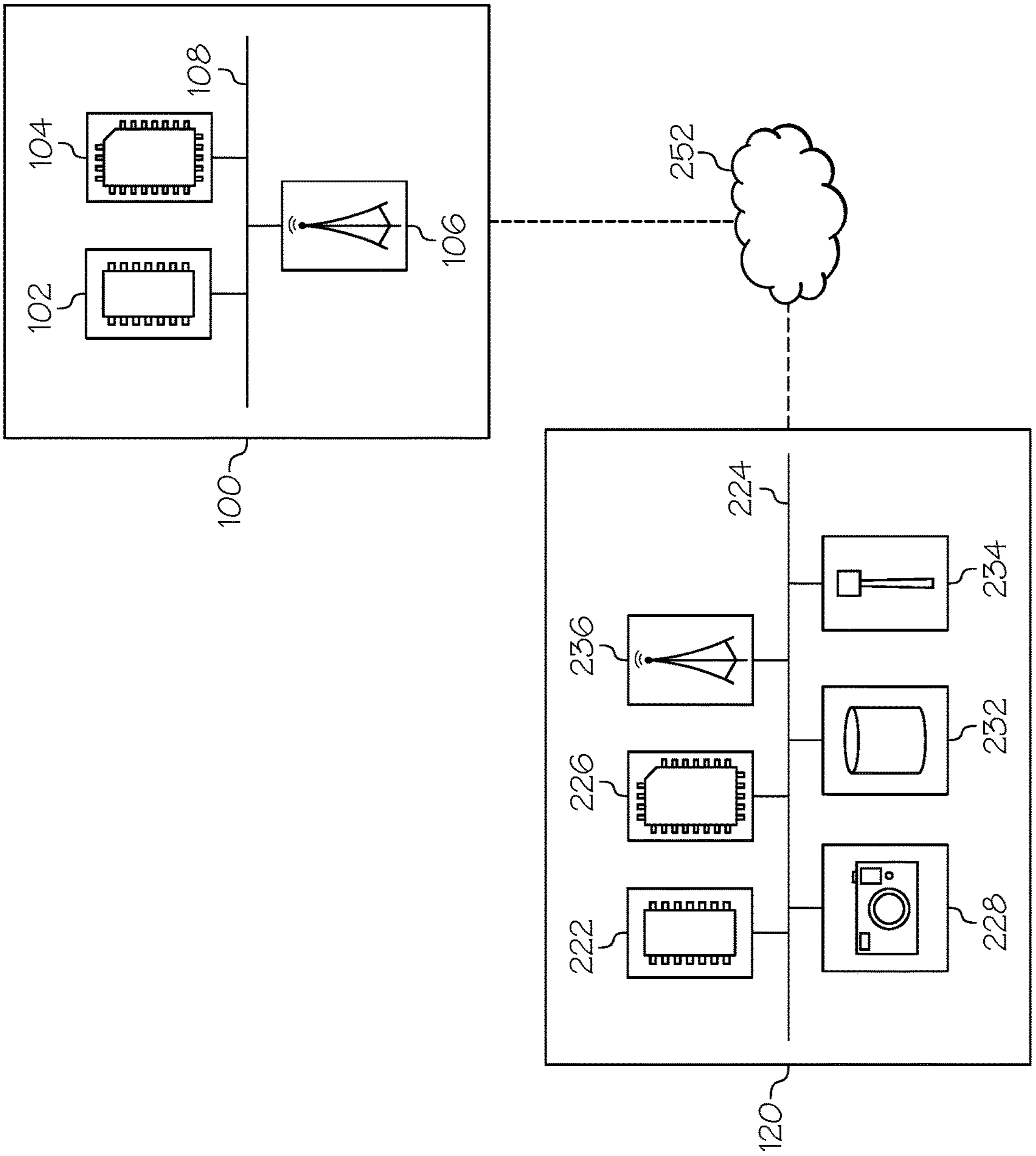
FIG. 1 schematically depicts a system for lane selection using connected vehicle data including lane connectivity and input uncertainty information, according to one or more embodiments shown and described herein.

FIG. 1 schematically depicts a system for lane selection using connected vehicle data according to one or more embodiments. The system includes a server 100 and a connected vehicle system 120. The server 100 may be an edge server, a road side unit or a cloud server. The server 100 may include one or more processors 102, memory 104, network interface hardware 106, and a communication path 108. Although FIG. 1 illustrates single instances of constituent components of the server 100, it is understood that the server 100 may include any number of constituent components thereof.

The one or more processors 102 may be a controller, an integrated circuit, a microchip, a computer, or any other computing device. The memory 104 may comprise RAM, ROM, flash memories, hard drives, or any device capable of storing machine readable and executable instructions such that the machine readable and executable instructions can be accessed by the one or more processors 102. In certain embodiments, the memory 104 may be configured to include any number of program modules in the form of operating systems, application program modules, and other program modules stored in one or more memory modules. Such a program module may include, but is not limited to, routines, subroutines, programs, objects, components, data structures and the like for performing specific tasks or executing specific data types as will be described below.

The network interface hardware 106 can be communicatively coupled to the communication path 108 and can be any device capable of transmitting and/or receiving data via a network. Accordingly, the network interface hardware 106 can include a communication transceiver for sending and/or receiving any wired or wireless communication. For example, the network interface hardware 106 may include an antenna, a modem, LAN port, Wi-Fi card, WiMax card, mobile communications hardware, near-field communication hardware, satellite communication hardware and/or any wired or wireless hardware for communicating with other networks and/or devices. The network interface hardware 106 may transmit and receive data to and from any number of connected vehicles.

Figure 5:
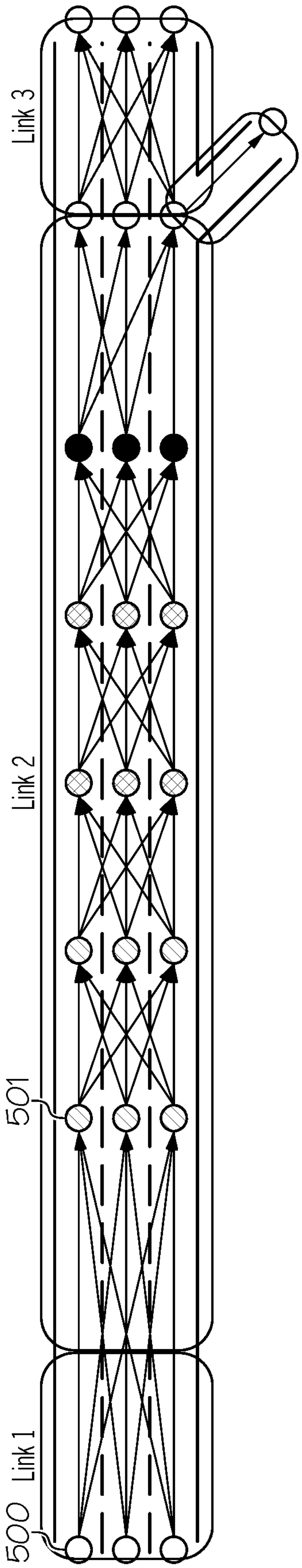
FIG. 5 depicts an example of neighborhood node detection, according to one or more embodiments shown and described herein.

The memory 104, which may include one or more memory modules, may be configured to store computer-executable instructions that, when executed by the one or more processors 102 cause it to generate a dynamic lane-level forward graph including a plurality of nodes for a road, e.g., the graph as illustrated in FIG. 5. By way of example, the plurality of nodes comprise one or more static nodes, one or more semi-static nodes, one or more dynamic nodes, or any combination thereof. In certain embodiments, any of the plurality of nodes may be assigned based on map data. For example, the one or more processors 102 may be configured to assign one or more of the static nodes based on map data including one or more lane markers.

The one or more processors 102 may be configured to compute weights for each action of a vehicle traveling from one node to a next node. By way of example, the weights may be computed based on an estimation of utility that takes into account vehicle travel on a link, lane changes, and traffic congestion. In certain embodiments, traveling on the link may include a weighted sum of longitudinal cost of traveled lanes. For example, if a vehicle changes from a first lane to a second lane, the average longitudinal cost of the first and second lanes may be considered as the traveling cost. Regarding lane changes, this may be inconvenient. The level of inconvenience in changing lanes may depend on one or more factors, including but not limited to an available distance for lane changing, density of the target lane, driver characteristics, or any combination thereof. Regarding congestion, the addition of a vehicle to a lane with a given density may increase the congestion level of that link by a margin. The marginal cost of adding a vehicle to the target lane may be used as a congestion cost.

The one or more processors 102 may be configured to determine values of different actions for the vehicle based on the dynamic lane-level forward graph starting from a node of the vehicle to a node of destination and the weights for each action of the vehicle. In certain embodiments, the values of different actions for the vehicle may be determined further based on a probability of the vehicle being in each of lanes of the road. By way of example, the probability of the vehicle being in each of the lanes of the road may be calculated based on image data captured by the vehicle.

The one or more processors 102 may be configured to select an action among the different actions based on a comparison of the values of the different actions.

The one or more processors 102 may be configured to instruct the vehicle to execute the selected action for the vehicle. By way of example, the selected action may include going straight. In another example, the selection action may include changing lanes to a left. In yet another example, the selection action may include changing lanes to a right.

In certain embodiments, the one or more processors 102 may be configured to identify one or more lane-level states. For example, the one or more lane-level states may include a traffic jam, a pothole, a risk of a crash, a road surface, a comfort level, one or more vehicle incidents, or any combination thereof. In certain embodiments, these one or more lane-level states may be semi-static, such as potholes which do not change in a short time period. The one or more lane-level states may be dynamic, such as traffic jams which are dynamic and can change in a short time period. The one or more lane-level states may be identified based on data received from connected vehicles driving on the corresponding road, such as image data captured by sensors of the connected vehicles, driving data including speeds, accelerations, lane change actions, and the like.

In certain embodiments, the one or more processors 102 may be configured add one or more static events, one or more semi-static events, one or more dynamic events, or any combination thereof, to the dynamic lane-level forward graph whose location determines the addition of one or more nodes at a beginning and an ending of one or more lanes. For example, the one or more processors 102 may be configured to prohibit the addition of the one or more nodes to the dynamic lane-level forward graph based on a predetermined threshold distance relative to the one or more static events, the one or more semi-static events, the one or more dynamic events, or any combination thereof.

Figure 2A:
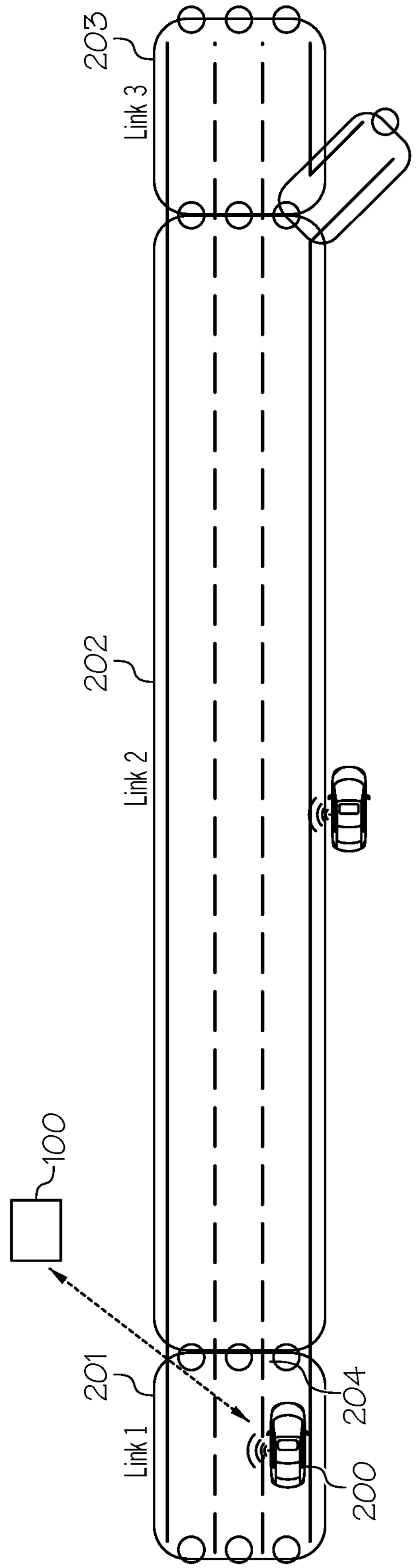
FIG. 2A depicts an example of the assignment of static nodes, according to one or more embodiments shown and described herein.

The connected vehicle system 120 may be included within a vehicle such as the connected vehicle 200 in FIG. 2A. The vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The first connected vehicle system 120 includes one or more processors 222. Each of the one or more processors 222 may be any device capable of executing machine readable and executable instructions. Accordingly, each of the one or more processors 222 may be a controller, an integrated circuit, a microchip, a computer, or any other computing device. The one or more processors 222 are coupled to a communication path 224 that provides signal interconnectivity between various modules of the system. Accordingly, the communication path 224 may communicatively couple any number of processors 222 with one another, and allow the modules coupled to the communication path 224 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 224 may be formed from any medium that is capable of transmitting a signal such as, for example, conductive wires, conductive traces, optical waveguides, or the like. In some embodiments, the communication path 224 may facilitate the transmission of wireless signals, such as WiFi, Bluetooth®, Near Field Communication (NFC) and the like. Moreover, the communication path 224 may be formed from a combination of mediums capable of transmitting signals. In one embodiment, the communication path 224 comprises a combination of conductive traces, conductive wires, connectors, and buses that cooperate to permit the transmission of electrical data signals to components such as processors, memories, sensors, input devices, output devices, and communication devices. Accordingly, the communication path 224 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The first connected vehicle system 120 includes one or more memory modules 226 coupled to the communication path 224. The one or more memory modules 226 may comprise RAM, ROM, flash memories, hard drives, or any device capable of storing machine readable and executable instructions such that the machine readable and executable instructions can be accessed by the one or more processors 222. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 226. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 226 may include machine readable instructions that, when executed by the one or more processors 222, obtain a dynamic lane-level forward graph including a plurality of nodes for a road, compute weights for each action of a vehicle traveling from one node to a next node, determine values of different actions for the vehicle based on the dynamic lane-level forward graph starting from a node of the vehicle to a node of destination and the weights for each action of the vehicle, select an action among the different actions based on a comparison of the values of the different actions, and instruct the vehicle to execute the selected action for the vehicle.

Referring still to FIG. 1, the first connected vehicle system 120 comprises one or more sensors 228. The one or more sensors 228 may be any device having an array of sensing devices capable of detecting radiation in an ultraviolet wavelength band, a visible light wavelength band, or an infrared wavelength band. The one or more sensors 228 may have any resolution. In some embodiments, one or more optical components, such as a mirror, fish-eye lens, or any other type of lens may be optically coupled to the one or more sensors 228. In some embodiments, the one or more sensors 228 may also provide navigation support. That is, data captured by the one or more sensors 228 may be used to autonomously or semi-autonomously navigate the connected vehicle 200.

In some embodiments, the one or more sensors 228 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image. Ranging sensors like radar may be used to obtain a rough depth and speed information for the view of the first connected vehicle system 120. The first connected vehicle system 120 may capture road boundaries, lane markings, static objects, moving objects, and the like using one or more imaging sensors.

In operation, the one or more sensors 228 capture image data and communicate the image data to the one or more processors 222 and/or to other systems communicatively coupled to the communication path 224. The image data may be received by the one or more processors 222, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

The first connected vehicle system 120 comprises a satellite antenna 234 coupled to the communication path 224 such that the communication path 224 communicatively couples the satellite antenna 234 to other modules of the first connected vehicle system 120. The satellite antenna 234 is configured to receive signals from global positioning system satellites. Specifically, in one embodiment, the satellite antenna 234 includes one or more conductive elements that interact with electromagnetic signals transmitted by global positioning system satellites. The received signal is transformed into a data signal indicative of the location (e.g., latitude and longitude) of the satellite antenna 234 or an object positioned near the satellite antenna 234, by the one or more processors 222.

The first connected vehicle system 120 comprises one or more vehicle sensors 232. Each of the one or more vehicle sensors 232 is coupled to the communication path 224 and communicatively coupled to the one or more processors 222. The one or more vehicle sensors 232 may include one or more motion sensors for detecting and measuring the orientation, acceleration, motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle. The one or more vehicle sensors 232 may include wheel sensors for detecting wheel angles.

Still referring to FIG. 1, the first connected vehicle system 120 comprises network interface hardware 236 for communicatively coupling the first connected vehicle system 120 to the server 100. The network interface hardware 236 can be communicatively coupled to the communication path 224 and can be any device capable of transmitting and/or receiving data via a network. Accordingly, the network interface hardware 236 can include a communication transceiver for sending and/or receiving any wired or wireless communication. For example, the network interface hardware 236 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 236 includes hardware configured to operate in accordance with the Bluetooth® wireless communication protocol. The network interface hardware 236 of the first connected vehicle system 120 may transmit its data to the server 100. For example, the network interface hardware 236 of the first connected vehicle system 120 may transmit captured point cloud generated by the first connected vehicle system 120, vehicle data, location data, and the like to other connected vehicles or the server 100.

The first connected vehicle system 120 may connect with one or more external vehicles and/or external processing devices (e.g., the server 100) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect (e.g., the network 252), which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 1, the first connected vehicle system 120 may be communicatively coupled to the server 100 by the network 252. In one embodiment, the network 252 may include one or more computer networks (e.g., a personal area network, a local area network, or a wide area network), cellular networks, satellite networks and/or a global positioning system and combinations thereof. Accordingly, the first connected vehicle system 120 can be communicatively coupled to the network 252 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

FIG. 2A through FIG. 5 depict generating a dynamic lane-level forward graph, according to one or more embodiments shown and described herein. The server 100 may generate a dynamic lane-level forward graph that may be used to determine driving actions for the vehicle 200 such as lane changing actions to reach a destination. As schematically depicted in FIG. 2A, the one or more processors 102 of the server 100 may be configured to add one or more static nodes. Vehicle 200 may include a connected vehicle, such as a connected ego vehicle. It is understood that vehicle 200 may be autonomously driven or driven by an operator.

Figure 2B:
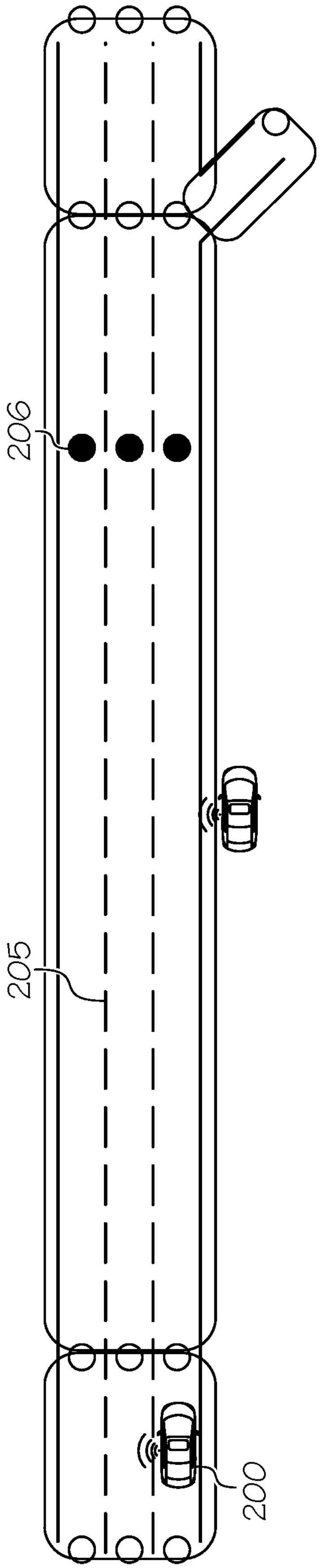
FIG. 2B depicts an example of the assignment of the static nodes relative to marker nodes, according to one or more embodiments shown and described herein.

Each link, in this case where there are first, second and third links, 201, 202, and 203 may be connected to another link via nodes such as nodes 204. The one or more processors 102 may add the nodes between links based on map data including information about the links. As schematically depicted in FIG. 2B, the one or more processors 102 may be configured to use map data, such as lane markers 205, and assign virtual static nodes 206 at both ends of the solid lane markers. In some embodiments, the server 100 may receive information about the solid lane markers in real time from connected vehicles driving in the link 202 and capturing images of the corresponding road. In the case, a new virtual node is close to existing nodes, the one or more processors 102 may be configured to only keep the existing nodes.

Figure 3A:
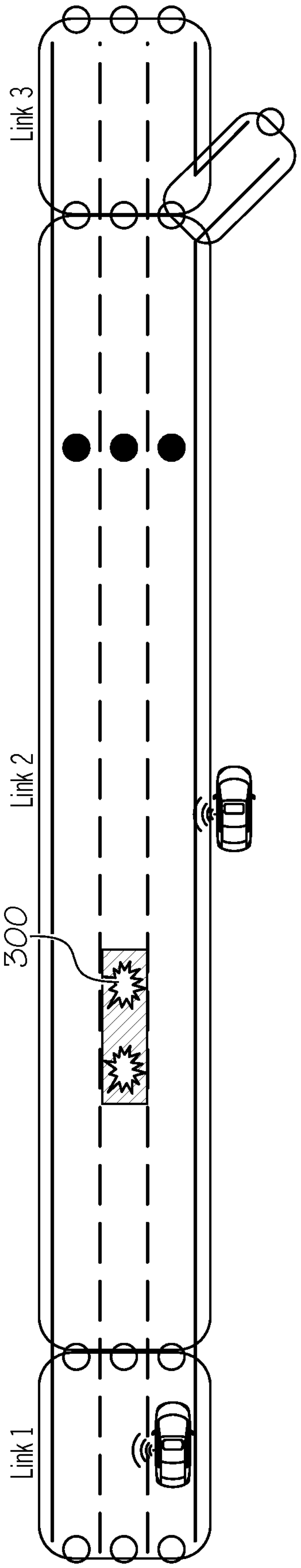
FIG. 3A depicts an example of the assignment of semi-static events, according to one or more embodiments shown and described herein.
Figure 3B:
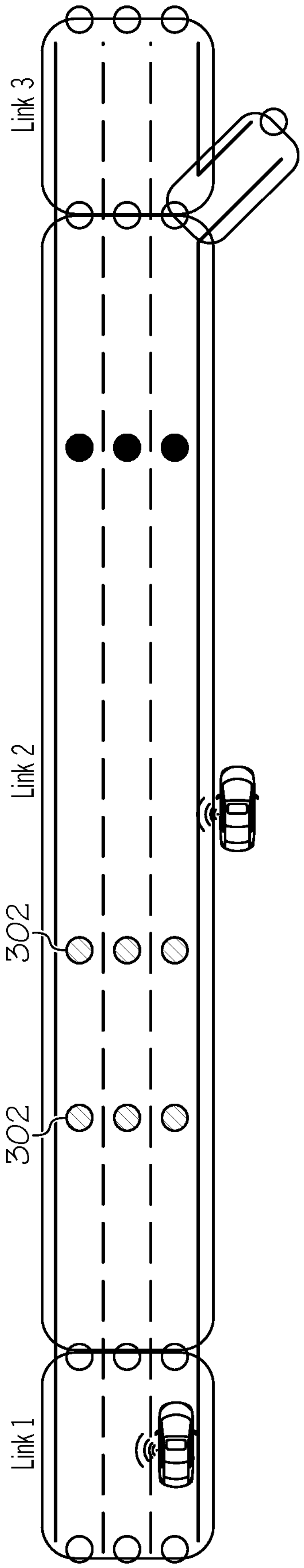
FIG. 3B depicts an example of the assignment of semi-static nodes, according to one or more embodiments shown and described herein.

As schematically depicted in FIG. 3A, the one or more processors 102 may be configured to add one or more semi-static events, such as potholes 300, in the second link 202 based on map data or data collected from connected vehicles driving in corresponding road. As schematically depicted in FIG. 3B, the one or more processors 102 may be configured to utilize location of the sections of the road with potholes 300 to add new virtual nodes 302 at a beginning and end of each lane in the given link.

Figure 4A:
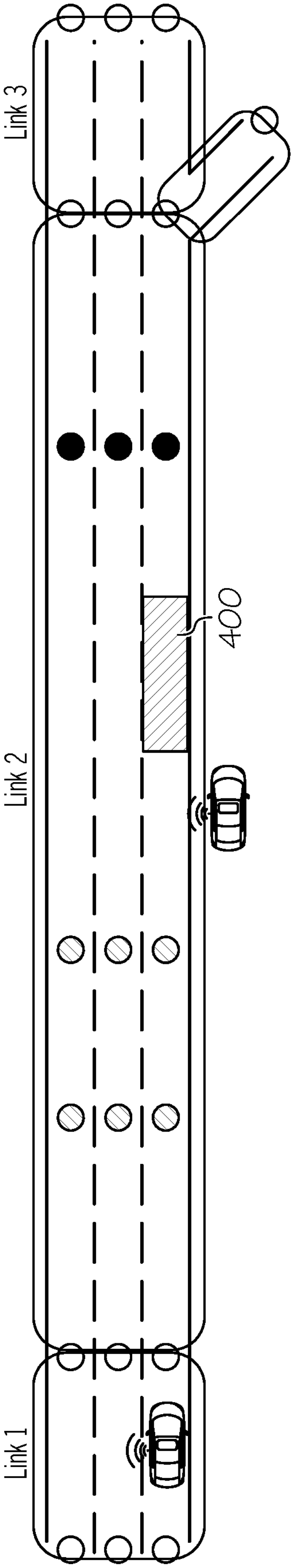
FIG. 4A depicts an example of the assignment of dynamic events, according to one or more embodiments shown and described herein.
Figure 4B:
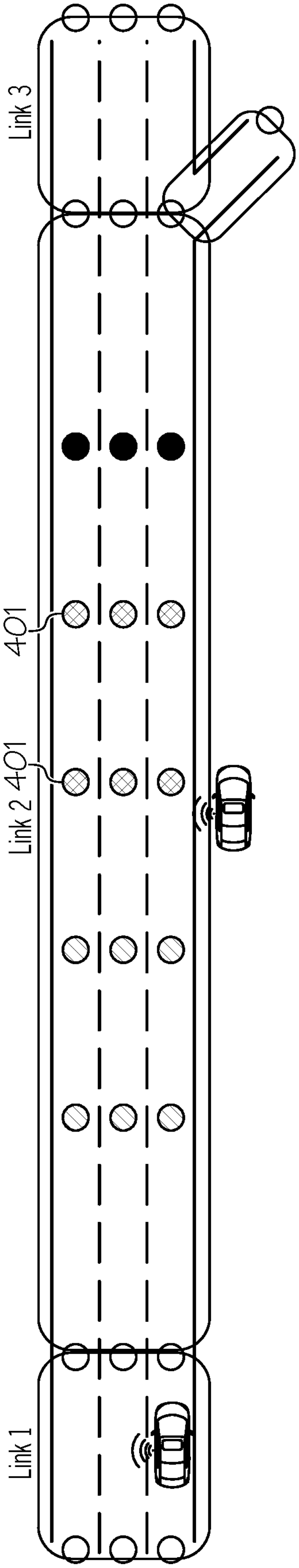
FIG. 4B depicts an example of the assignment of dynamic nodes relative to a dynamic event, according to one or more embodiments shown and described herein.

As schematically depicted in FIG. 4A, the one or more processors 102 may be configured to add one or more dynamic nodes for dynamic events, including but not limited to traffic jams 400 which may be dynamic in nature, such as that in the second link 202. The server 100 may receive information about dynamic events from connected vehicles driving in the second link 202. As schematically depicted in FIG. 4B, the one or more processors 102 may be configured to add nodes 401 to the beginning and end of the dynamic event, such as the traffic jam 400. In a case where the nodes are closer than a threshold distance already existing, the one or more processors 102 may be configured to not add the new nodes.

As schematically depicted in FIG. 5, the one or more processors 102 may be configured to detect neighbors of each node using map and lane marker data relative to each of the links. The one or more processors 102 may be configured to connect lane nodes 500 to all the next nodes 501 unless there are limitations, such as the presence of solid lane markers.

Figure 6:
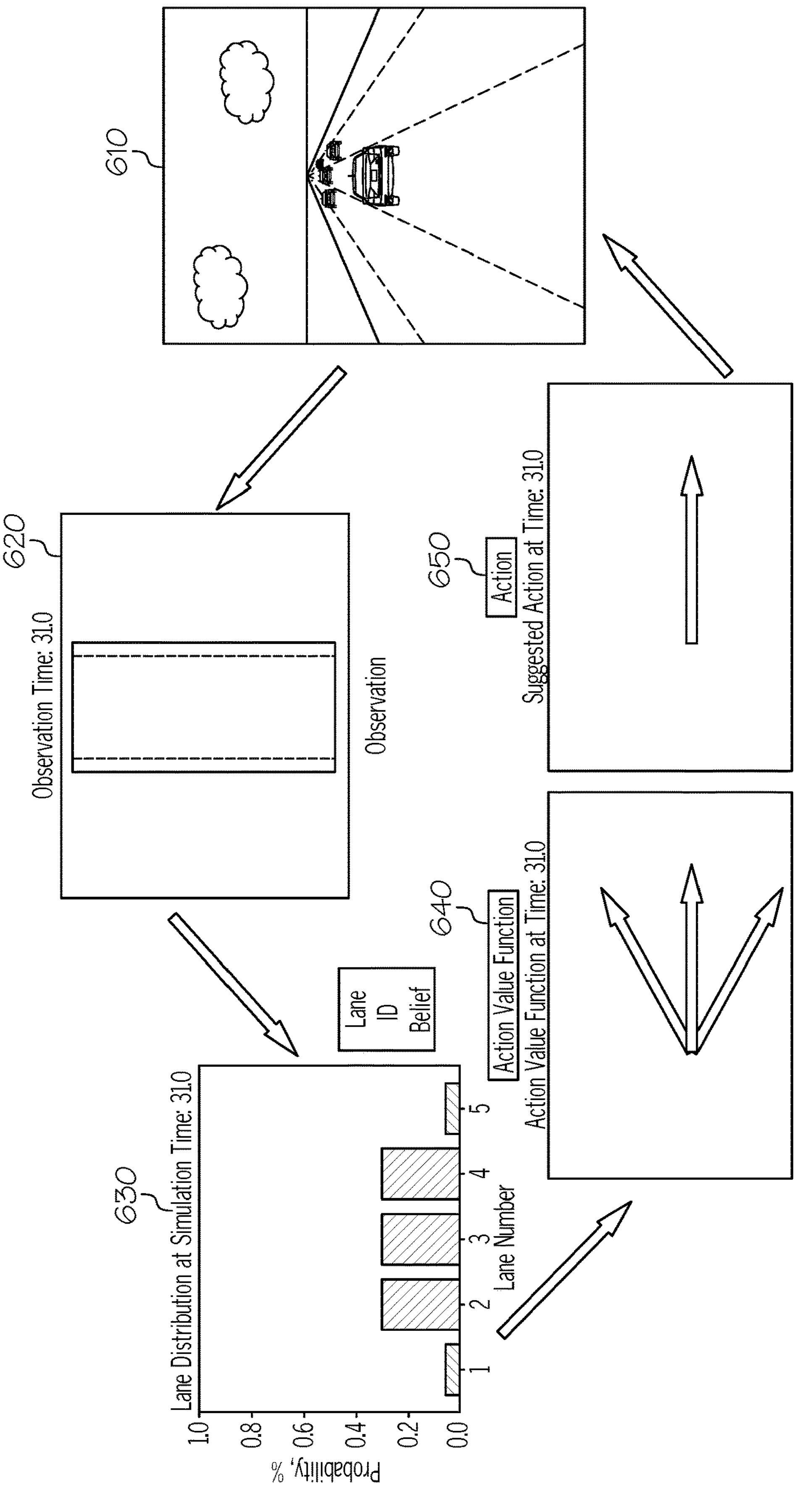
FIG. 6 depicts an example of steps to determine a vehicle action regarding lane action under uncertainty as performed by the server of FIG. 1, according to one or more embodiments shown and described herein.

FIG. 6 depicts an example of steps to determine a vehicle action regarding lane action under uncertainty as performed by the server of FIG. 1, according to one or more embodiments shown and described herein. Once the dynamic lane-level forward graph is generated, the server determines a vehicle action using the dynamic lane-level forward graph.

The one or more processors 102 of the server 100 may be configured to determine a vehicle action regarding lane selection under uncertainty via 610 through 650 of FIG. 6. For example, in step 610 of FIG. 6, the one or more processors 102 may be configured to acquire map image data relative to the vehicle 200 and lane markers at a predetermined period of time. The predetermined period of time may correspond to an observation period of time. It is understood that the one or more processors may be configured to acquire other data from the vehicle 200, including but not limited to vehicle data such as its position, speed, route, sensor data, and adjacent vehicle dynamics. The one or more processors 102 may be configured to execute a map matching process to identify a road link identifier as well as a matched position of the vehicle 200 on a map. Based on the position of the vehicle 200, the one or more processors 102 may retrieve a dynamic lane-level forward graph that includes the position of the vehicle 200 as a starting point in order to determine and subsequently select a vehicle action. In certain embodiments, the dynamic lane-level forward graph may refer to the dynamic lane-level forward graph in the manner set forth above with respect to FIG. 2A to FIG. 5.

Next, in step 620 of FIG. 6, the one or more processors 102 may be configured to ascertain, based on the map image data, marker designations, such as one or more right lane markers as indicated by a dashed line and/or one or more left lane markers as indicated by a dashed line. It is understood that the one or more processors 102 may be configured to also ascertain a solid line for a given lane and therefore is not limited to only dashed line lane markers.

Based on observation of these marker designations, in step 630 of FIG. 6, the one or more processors 102 may be configured to determine a probability of the vehicle 200 being in and relative to any number of lanes on the road. In certain embodiments, this probability determination may be referred to as a lane identifier belief. In certain embodiments, a lane identifier of the vehicle 200 may be estimated, such as corresponding to a particular lane of a given number of lanes on the road. Because of uncertainties that may be caused by factors such as lack of a high-definition map, low-precision GPS, and sensor error, the precise lane identifier of the vehicle 200 may be uncertain. By way of example and without limitation, the number of lanes may include five lanes. In certain embodiments, the one or more processors 102 may be configured to utilize sensor data to estimate probabilities of the ego vehicle 200 being in each of the lanes. By way of example on a four-lane highway, the one or more processors 102 may be configured to output [0.1, 0.3, 0.4, 0.2], in which the probability of the ego vehicle 200 to be in the left-most lane is 10%, the probability of the ego vehicle 200 to be in the second left-most lane is 30%, the probability of the ego vehicle 200 to be in the second right-most lane is 40%, and the probability of the ego vehicle 200 to be in the right-most lane is 20%.

In response to determining the probability of the vehicle 200 being in each of the lanes of the road, in step 640 of FIG. 6, the one or more processors 102 may be configured to determine utility of taking a particular vehicle action via an action value function and the dynamic lane-level forward graph. For example, the one or more processors 102 may calculate a value for each of actions including going straight, changing lanes to the left, and changing lanes to the right using the dynamic lane-level forward graph. For example, the one or more processors 102 may be configured to take into account historical data to build a model that estimates transition probability of changing lanes on the road by the vehicle 200. t lanes because the static event and the semi-static event each may not be an optimal action regarding lane selection since the presence of these events in the respective lanes (and corresponding lane decision selection) may be costly in terms of an adverse effect on congestion, a likelihood of increased density of vehicles in a target lane, or the like. Thus, the one or more processors 102 may be configured to thereby determine there is a lower utility, such as a lower action value in changing lanes to the left or to the right as opposed to continuing straight, which would be associated with a greater utility, such as a greater action value. In certain embodiments, longitudinal weights may be computed based on the graph longitudinal weights. For example, if the position of the vehicle 200 is in the middle of the link, half of the longitudinal vertex on the same lane may be assigned to the longitudinal weights. In addition, lateral weights may be computed based one or more factors, such as a degree of discomfort associated with lane changes and the effect on traffic congestion.

Figure 9A:
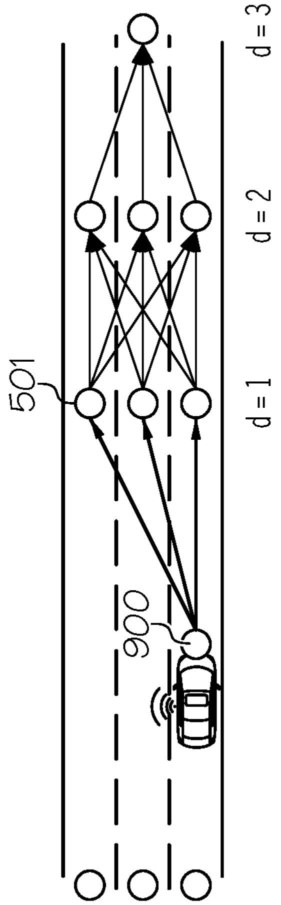
FIG. 9A depicts an example of weight computation of actions based on a certain lane identifier, according to one or more embodiments shown and described herein.
Figure 9B:
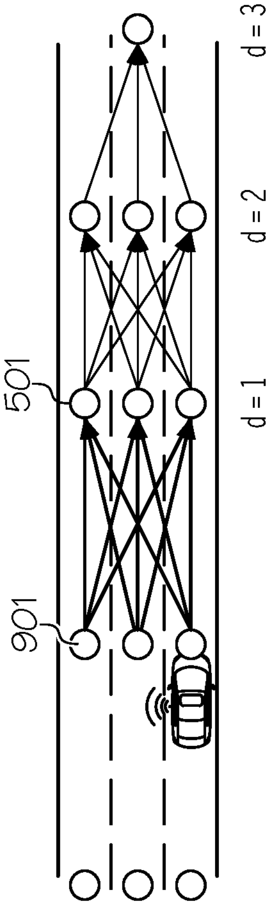
FIG. 9B depicts an example of weight computation of actions based on an uncertain lane identifier, according to one or more embodiments shown and described herein.

In embodiments, the one or more processors 102 calculate values of going straight, turning to the right, or turning to the left considering the current position of the vehicle 200 or unknown position of the vehicle 200. For example, by referring to FIG. 9A, if the position of the vehicle 900 is known, the vehicle 200 cannot turn to the right. Thus, the one or more processors 102 calculate values of going straight and turning to the rights considering longitudinal weights and/or lateral weights. If the position of the vehicle is not known as illustrated in FIG. 9B, the one or more processors 102 calculate the values of going straight, turning to the right, or turning to the left for each possible position of the vehicle 200. For example, the one or more processors 102 calculate the values of going straight, turning to the right, or turning to the left assuming that the vehicle 200 is in the left lane. In addition, the one or more processors 102 calculate the values of going straight, turning to the right, or turning to the left assuming that the vehicle 200 is in the middle lane. Further, the one or more processors 102 calculate the values of going straight, turning to the right, or turning to the left assuming that the vehicle 200 is on the right lane. Then, the one or more processors 102 sum values of each action in three different scenarios with the consideration of probability of the vehicle 200 in each of the lanes. Specifically, the one or more processors 102 calculate weighted sum of the values of turning to the left when the vehicle is in the left lane, the value of turning to the left when the vehicle is in the middle lane, and the value of turning to the left when the vehicle in in the right lane. Here, the weights are the probability of the vehicle 200 being in each of the lanes. Similarly, the one or more processors 102 calculate weighted sum of the values of going straight and weighted sum of the values of turning to the right.

In step 650 of FIG. 6, the one or more processors 102 may be configured to determine the vehicle action based on the utility determination. The one or more processors 102 may select a vehicle action based on the actions values of the potential actions including going straight, changing left and changing right. In particular, the one or more processors 102 may be configured to instruct the vehicle 200 to execute the selected action for the vehicle 200. As depicted by the arrow, and by way of example, the selected action may include going straight. However, it is understood that other selected actions may be suggested by the one or more processors 102, such as changing left or changing right.

With further reference to step 650 of FIG. 6, in certain embodiments, once a lane change instruction is transmitted to the driver of the vehicle 200, or the vehicle 200 itself, the driver or the vehicle 200 may execute the lane change in accordance with the lane change instruction, thereby following the lane change instruction. In other embodiments, the driver or the vehicle 200 may not follow the lane change instruction, thereby declining it, due to one or more factors, such as behavioral characteristics, density of vehicles 200 in a target lane, distance to an exit, or any combination thereof. For a given planning step to change lanes, the one or more processors 102 may be configured to utilize the vehicle data to estimate the probability of transitions. By way of example, the probability of accepting the lane change instruction and changing the lane to the right may be 60%.

Figure 7:
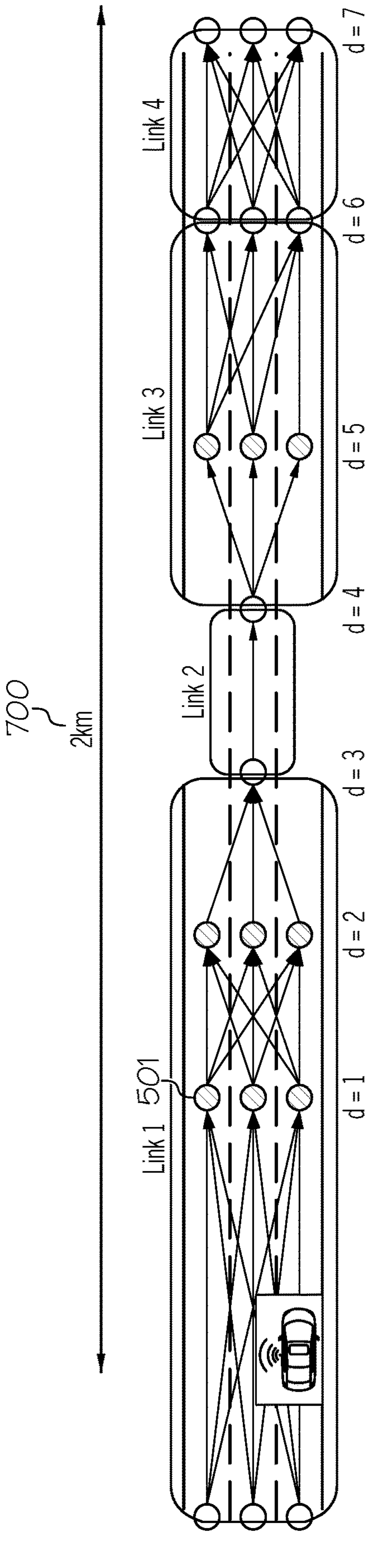
FIG. 7 depicts an example of depth selection based on a distance threshold, according to one or more embodiments shown and described herein.

FIG. 7 depicts an example of depth selection based on a distance threshold, according to one or more embodiments shown and described herein. The depth selection is selecting the length of the dynamic lane-level forward graph.

In certain embodiments, the one or more processors 102 may be configured to determine a depth by utilizing ego vehicle data, including its position along with the dynamic lane-level forward graph. For example, if the depth is too short, the lane selection suggestions may not be optimal. In another example, if the depth is too deep, the computational complexity of calculating values of actions by vehicles may be significant. Accordingly, the depth of the dynamic lane-level forward graph is important insofar as it concerns the computational processing associated with the search for lane selection suggestions. In certain embodiments, the one or more processors 102 may be configured to determine the depth by a threshold on a length. By way of example and without limitation, the one or more processors 102 may be configured to select all nodes that are closer than 2 km. In another example and without limitation, the one or more processors 102 may be configured to set a limit on the depth, such as depth equal to five.

Further, one or more processors 102 may be configured prune the dynamic lane-level forward graph based on actions available at the plurality of the nodes. By pruning the dynamic lane-level forward graph, the one or more processors 102 may be configured to reduce the depth based on the actions available at the plurality of the nodes. For example, if a portion of the road has only a single lane, vehicles 200 cannot change lanes and all vehicles 200 may have to pass the single lane. The dynamic lane-level forward graph may be pruned by the one or more processor 102 and only search until the node with the single lane.

As further depicted in FIG. 7, the one or more processors 102 may be configured to select a depth based on a distance threshold 700 of 2 kilometers to lead to a depth (d) of 7. In this case, four links are depicted in FIG. 7, among which a second link (Link 2) includes only one lane and vehicles 200 cannot change lanes. To plan lane changes of the vehicle 200, it is not necessary for the one or more processors 102 to plan for the entirety of the 2 kilometers of depth of 7. Therefore, the one or more processors 102 may be configured to plan until the second link, depth of three, such that when the vehicle 200 reaches the second link, another horizon may be selected. In this manner, the one or more processors 102 may be configured to prune the dynamic lane-level forward graph to reduce a search space. By reducing the depth, the computational complexity associated with searching for lane selections may be reduced and the one or more processors 102 may be configured to identify an optimal solution, such as lane change actions, more efficiently and faster.

Figure 8A:
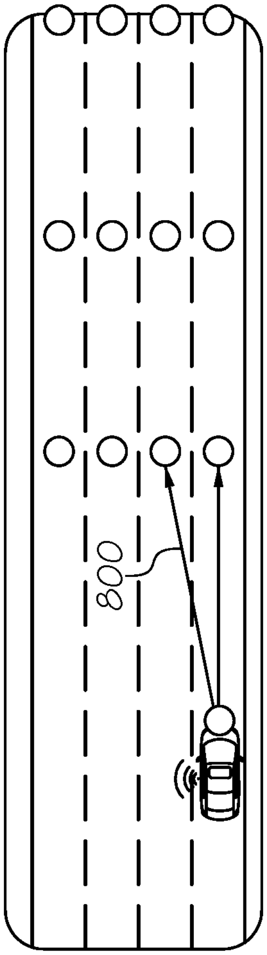
FIG. 8A depicts an action space selection based on a set of actions, according to one or more embodiments shown and described herein.
Figure 8B:
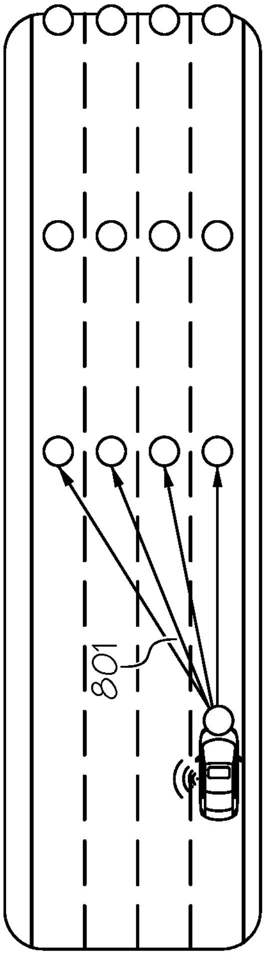
FIG. 8B depicts an action space selection based on another set of actions, according to one or more embodiments shown and described herein.

The one or more processors 102 may be further configured to select an action space based on requirements and available resources, as depicted in FIG. 8A and FIG. 8B. In certain embodiments, the one or more processors 102 may be configured to select any number sets of actions. For example, as schematically depicted in FIG. 8A, one set of actions 800 may include: change to the right, no lane change, change to the left. Regarding this one set of actions, the ego vehicle 200 at each planning step may be configured to choose from three actions. The one or more processors 102 may be configured to modify the dynamic lane-level forward graph and add virtual nodes to assure that the vehicle 200 may reach downstream nodes on its route.

As schematically depicted in FIG. 8B, another set of actions 801 may include lane changes to all lanes, including: change to the right one, change to the right twice, change to the right three times, no lane change, change to the left one, change to the left twice, and change to the left three times. For example, the ego vehicle 200 may choose from actions defined by a function utilizing the number of lanes less one, then multiplied by two, and adding one. By way of example, for a four-lane road, there will be seven actions. In this case, the one or more processors 102 need not modify the dynamic lane-level forward graph as it can reach any downstream node.

The one or more processors 102 may be configured to create a search graph. As schematically depicted in FIG. 9A, a node 900 may be added at the position of the vehicle 200. For example, when the lane identifier is certain, a single node 900 may be added by the one or more processors 102 to the lane of the vehicle 200. Should the lane identifier be uncertain, nodes 901 may be added by the one or more processors 102 to all lanes at the position of the vehicle 200, as depicted in FIG. 9B. The one or more processors 102 may be configured to add connections to the first downstream nodes, which may be based on the action space selected.

Next, the one or more processors 102 may be configured to compute weights of the connections. In certain embodiments, longitudinal weights may be computed based on the graph longitudinal weights. For example, if the position of the vehicle 200 is in the middle of the link, half of the longitudinal vertex on the same lane may be assigned to the longitudinal weights. In additional, lateral weights may be computed based one or more factors, such as a degree of discomfort associated with lane changes and the effect on traffic congestion.

Figure 10:
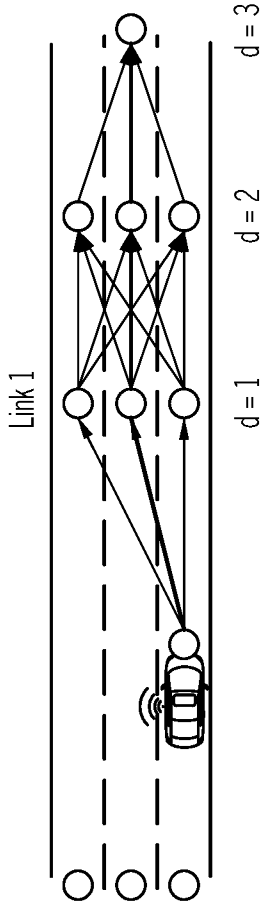
FIG. 10 depicts an estimation of utilities at a maximum depth for various nodes, according to one or more embodiments shown and described herein.

After creating the search graph, the one or more processors 102 may be configured to select an optimum action. In certain embodiments, the one or more processors 102 may be configured to estimate utilities at a maximum depth. For example, the one or more processors 102 may be configured to estimate the overall utility for each end node for the last nodes of the graph, such as at depth of 3, as shown in FIG. 10. If there is only one node, any number may be assumed. If there are two or more nodes, the one or more processors 102 may be configured to estimate the utility from each node using a sampling technique. More particularly, a search method may be selected by the one or more processors 102 based on a degree of the depth. For example, if the depth of the graph is shallow, then a method such as a forward search may be utilized. If the depth of the graph is deep, then utilizing forward search may be computationally extensive, and therefore the one or more processors 102 may instead utilize a Monte Carlo Tree Search. These methods may be configured to find the optimal lanes. For example, if the lane identifier is uncertain, the shortest paths from all lanes may be identified by the one or more processors 102, which may then be configured to select an action with the lowest cost, highest reward. Based on this information, the one or more processors 102 may be configured to compute the optimal lane change action. In response, the vehicle 200, as instructed by the one or more processors 102 may be configured to apply the selected action, for example change to the left. Should the vehicle 200 reach the destination, the process may terminate, else the process may repeat at the next node.

Figure 11:
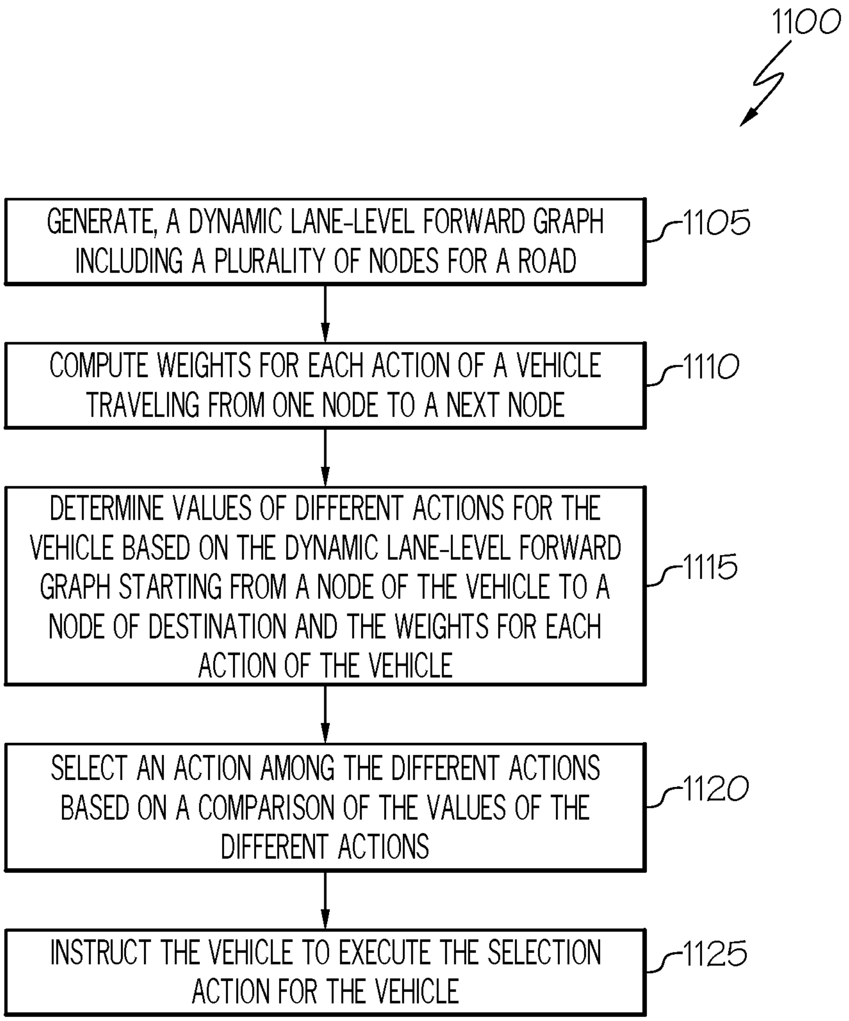
FIG. 11 depicts a flowchart of a method that may be performed by the server of FIG. 1, according to one or more embodiments shown and described herein.

FIG. 11 depicts a flowchart of an example method 1100 that may be performed by the server, such as the one or more processors 102, of FIG. 1. FIG. 11 may reference and incorporate any of the operations and constituent components of the server 100.

For example, the method 1100 may include a method of executing a lane change for a vehicle. At step 1105, the method 1100 may include generating a dynamic lane-level forward graph including a plurality of nodes for a road. By way of example, the plurality of nodes comprise one or more static nodes, one or more semi-static nodes, one or more dynamic nodes, or any combination thereof. In certain embodiments, any of the plurality of nodes may be assigned based on map data. For example, the method 1100 may include assigning one or more of the static nodes based on map data including one or more lane markers.

At step 1110, the method 1100 may include computing weights for each action of a vehicle traveling from one node to a next node. By way of example, the weights may be computed based on an estimation of utility that takes into account vehicle travel on a link, lane changes, and traffic congestion.

At step 1115, the method 1100 may include determining values of different actions for the vehicle based on the dynamic lane-level forward graph starting from a node of the vehicle to a node of destination and the weights for each action of the vehicle. In certain embodiments, the values of different actions for the vehicle may be determined further based on a probability of the vehicle being in each of lanes of the road. By way of example, the probability of the vehicle being in each of the lanes of the road may be calculated based on image data captured by the vehicle.

At step 1120, the method 1100 may include selecting an action among the different actions based on a comparison of the values of the different actions.

At step 1125, the method 1100 may include instructing the vehicle to execute the selected action for the vehicle. By way of example, the selected action may include going straight. In another example, the selection action may include changing lanes to a left. In yet another example, the selection action may include changing lanes to a right.

In certain embodiments, the method 1100 may include identifying one or more lane-level states. For example, the one or more lane-level states may include a traffic jam, a pothole, a risk of a crash, a road surface, a comfort level, one or more vehicle incidents, or any combination thereof.

In certain embodiments, the method 1100 may include adding one or more static events, one or more semi-static events, one or more dynamic events, or any combination thereof, to the dynamic lane-level forward graph whose location determines the addition of one or more nodes at a beginning and an ending of one or more lanes. For example, the method 1100 may include prohibiting the addition of the one or more nodes to the dynamic lane-level forward graph based on a predetermined threshold distance relative to the one or more static events, the one or more semi-static events, the one or more dynamic events, or any combination thereof.

In certain embodiments, the method 1100 may include pruning the dynamic lane-level forward graph based on actions available at the plurality of the nodes.

It should now be understood that embodiments described herein are directed to systems and methods that provide, via a server, a decentralized lane selection technique utilizing uncertain input and plan vehicle actions based on uncertainty while considering lane connectivity information. By generating a dynamic graph, the server may be configured to select and instruct a vehicle to select a lane that considers uncertainty in an ego vehicle lane identifier; considers uncertainty in a transition from one lane to another lane; prunes a search graph to reduce computational complexity of the lane selection; and computes weights using metrics, such as marginal contribution to congestion. In this manner, downstream events are efficiently accounted for in determining whether or not the vehicle should select a lane to change to, and a graph is generated based on adding various types of nodes relative to the downstream events before then being pruned based on determining available actions at the various types of nodes, thereby resulting in reduced computational processing in lane selection.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of executing a lane change for a vehicle, the method comprising:

generating a dynamic lane-level forward graph including a plurality of nodes for a road;

pruning the dynamic lane-level forward graph based on actions available at the plurality of the nodes;

computing weights for each action of a vehicle traveling from one node to a next node;

determining values of different actions for the vehicle based on the dynamic lane-level forward graph starting from a node of the vehicle to a node of destination and the weights for each action of the vehicle;

selecting an action among the different actions based on a comparison of the values of the different actions;

instructing the vehicle to execute the selected action for the vehicle;

adding one or more static events, one or more semi-static events, one or more dynamic events, or any combination thereof, to the dynamic lane-level forward graph whose location determines an addition of one or more nodes at a beginning and an ending of one or more lanes; and prohibiting the addition of one or more nodes to the dynamic lane-level forward graph based on a predetermined threshold distance relative to the one or more static events, the one or more semi-static events, the one or more dynamic events, or any combination thereof.

2. The method of claim 1, wherein the values of different actions for the vehicle are determined further based on a probability of the vehicle being in each of lanes of the road.

3. The method of claim 2, wherein the probability of the vehicle being in each of the lanes of the road is calculated based on image data captured by the vehicle.

4. The method of claim 1, wherein the plurality of nodes comprise one or more static nodes, one or more semi-static nodes, one or more dynamic nodes, or any combination thereof.

5. The method of claim 4, further comprising assigning one or more of the static nodes based on map data including one or more lane markers.

6. The method of claim 1, further comprising identifying one or more lane-level states, the one or more lane-level states including a traffic jam, a pothole, a risk of a crash, a road surface, a comfort level, one or more vehicle incidents, or any combination thereof.

7. The method of claim 1, further comprising computing the weights based on an estimation of utility that takes into account vehicle travel on a link, lane changes, and traffic congestion.

8. The method of claim 1, wherein the selected action is going straight, changing lanes to a left, or changing lanes to a right.

9. A system comprising:

one or more processors programmed to:

generate a dynamic lane-level forward graph including a plurality of nodes for a road;

prune the dynamic lane-level forward graph based on actions available at the plurality of the nodes;

compute weights for each action of a vehicle traveling from one node to a next node;

determine values of different actions for the vehicle based on the dynamic lane-level forward graph starting from a node of the vehicle to a node of destination and the weights for each action of the vehicle;

select an action among the different actions based on a comparison of the values of the different actions;

instruct the vehicle to execute the selected action for the vehicle;

add one or more static events, one or more semi-static events, one or more dynamic events, or any combination thereof, to the dynamic lane-level forward graph whose location determines an addition of one or more nodes at a beginning and an ending of one or more lanes; and prohibit the addition of one or more nodes to the dynamic lane-level forward graph based on a predetermined threshold distance relative to the one or more static events, the one or more semi-static events, the one or more dynamic events, or any combination thereof.

10. The system of claim 9, wherein the values of different actions for the vehicle are determined further based on a probability of the vehicle being in each of lanes of the road.

11. The system of claim 10, wherein the probability of the vehicle being in each of the lanes of the road is calculated based on image data captured by the vehicle.

12. The system of claim 9, wherein the plurality of nodes comprise one or more static nodes, one or more semi-static nodes, one or more dynamic nodes, or any combination thereof.

13. The system of claim 12, wherein the one or more processors are further programmed to assign one or more of the static nodes based on map data including one or more lane markers.

14. The system of claim 9, wherein the one or more processors are further programmed to identify one or more lane-level states, the one or more lane-level states including a traffic jam, a pothole, a risk of a crash, a road surface, a comfort level, one or more vehicle incidents, or any combination thereof.

15. The system of claim 9, wherein the selected action is going straight, changing lanes to a left, or changing lanes to a right.

* * * * *